(12) United States Patent
Krambeck et al.

(10) Patent No.: US 10,843,657 B2
(45) Date of Patent: Nov. 24, 2020

(54) SEAT BELT BUCKLE TONGUE WITH A DEFLECTING ELEMENT

(71) Applicant: AUTOLIV DEVELOPMENT AB, Vargarda (SE)

(72) Inventors: Inga Krambeck, Elmshorn (DE); Hans-Jörg Cord, Norderstedt (DE); Michel Hermann, Pinneberg (DE); Martin Grikschat, Münsterdorf (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 4 days.

(21) Appl. No.: 16/090,980

(22) PCT Filed: Apr. 5, 2017

(86) PCT No.: PCT/EP2017/058093
§ 371 (c)(1),
(2) Date: Oct. 3, 2018

(87) PCT Pub. No.: WO2017/174650
PCT Pub. Date: Oct. 12, 2017

(65) Prior Publication Data
US 2019/0135224 A1 May 9, 2019

(30) Foreign Application Priority Data

Apr. 8, 2016 (DE) .......................... 10 2016 106 440

(51) Int. Cl.
*B60R 22/185* (2006.01)
*B60R 22/18* (2006.01)

(52) U.S. Cl.
CPC .. *B60R 22/1855* (2013.01); *B60R 2022/1806* (2013.01); *B60R 2022/1812* (2013.01)

(58) Field of Classification Search
CPC ........ B60R 22/1855; B60R 2022/1806; B60R 2022/1812; B60R 22/18; B60Y 2306/09
See application file for complete search history.

(56) References Cited

U.S. PATENT DOCUMENTS 5,058,244 A * 10/1991 Fernandez ............. A44B 11/12
24/136 K
5,870,816 A 2/1999 McFalls et al.
(Continued)

FOREIGN PATENT DOCUMENTS

DE 198 22 473 A1 3/1999
DE 10 2014 007 125 A1 11/2015
(Continued)

OTHER PUBLICATIONS

International Search Report of PCT/EP2017/058093 dated May 19, 2017.

*Primary Examiner* — Drew J Brown
(74) *Attorney, Agent, or Firm* — Dickinson Wright PLLC (57) ABSTRACT

A seat belt buckle tongue (1) with a tongue body (3) extending in the direction of plug-in (2), in which a strap slot (4) is formed for the passage of a strap (5), and a deflection element (6) movably the tongue body (3), The strap (5), in an unloaded passage position of the deflection element (6), is movable through the strap slot (4), and is at least prevented from moving by the deflection element (6) in the loading position of the deflection element (6) induced by a tensile force to the strap (5). The deflection element (6) is movable from the passage position into the loading position with a constriction portion (18) along the contact surface (19) of the tongue body (3), so that the strap (5) in the loading position with a strap portion is flat in contact with both the contact surface (19) of the tongue body (3) and with the constriction portion (18) of the deflection element (6). In the loading position, the tongue body (3) engages with a (Continued)

region having the contact surface (19), through at least the portion of the deflection element (6).

16 Claims, 6 Drawing Sheets

(56) References Cited

U.S. PATENT DOCUMENTS

| | | | | |
|---|---|---|---|---|
| 7,010,836 | B2 * | 3/2006 | Acton | A44B 11/2557 |
| | | | | 24/170 |
| 7,712,194 | B2 | 5/2010 | Fyhr | |
| 8,332,000 | B2 | 12/2012 | Ladouceur et al. | |
| 8,382,160 | B2 * | 2/2013 | Disley | A44B 11/2553 |
| | | | | 24/171 |
| 9,409,537 | B2 * | 8/2016 | Zhang | B60R 22/24 |
| 10,512,309 | B2 * | 12/2019 | Lee | B60R 22/30 |
| 2012/0286501 | A1 * | 11/2012 | Goudeau | A44B 11/2561 |
| | | | | 280/801.1 |
| 2016/0206050 | A1 | 7/2016 | Aoyagi | |
| 2017/0055643 | A1 | 3/2017 | Knoedl | |
| 2017/0297528 | A1 | 10/2017 | Hermann et al. | |
| 2017/0355349 | A1 * | 12/2017 | Betz | B60R 22/1855 |

FOREIGN PATENT DOCUMENTS

| | | |
|---|---|---|
| DE | 10 2014 106 097 A1 | 11/2015 |
| EP | 1 983 857 B1 | 10/2008 |
| WO | WO 2016/050763 A1 | 4/2016 |

\* cited by examiner

SEAT BELT BUCKLE TONGUE WITH A DEFLECTING ELEMENT

CROSS-REFERENCE TO RELATED APPLICATIONS

This application is a 35 U.S.C. § 371 national phase application of PCT International Application No. PCT/EP2017/058093, filed Apr. 5, 2017, which claims the benefit of priority under 35 U.S.C. § 119 to German Patent Application No. 10 2016 106 440.8, filed Apr. 8, 2016, the contents of which are incorporated herein by reference in their entirety.

FIELD OF THE INVENTION

The present invention relates to a seat belt buckle tongue with a tongue body extending in a plug-in direction, in which a strap slot is formed for the passage of a strap, and a deflection element is movably arranged in the tongue body. The strap is movable in an unloading passage position of the deflection element through the strap slot and is at least prevented from moving by the deflection element in an induced loading position of the deflection element by an introduced tensile force in the strap. The deflection element is movable from the passage position into the loading position with a constriction portion along a contact surface of the tongue body, so that the strap in the loading position with a strap portion is flat in contact with both the contact surface of the tongue body and the constriction portion of the deflection element.

BACKGROUND

In DE 198 22 473 A1, a seat belt buckle tongue is disclosed, in which a deflection element, formed as a clamping element, is arranged rotatably around an axis.

If the strap force exceeds a predetermined value, the clamping element pivots around its axis and clamps the strap with a clamping edge against a clamping jaw of the tongue body.

It has now been found that the forces occurring in a vehicle accident may be so great that the buckle tongue can be deformed, wherein the clamping edge of the clamping element does not securely clamp the strap against the jaws.

In EP 1983857 B1, a buckle tongue with the aforementioned features is disclosed, in which the deflection element is moved from the passage position into the loading position along the contact surface of the tongue body, so that a scissor-like chicane is formed for the strap, through which the strap passes and in which the strap with its sides is in contact with the contact surface of the tongue body or with the constriction portion of the deflection element.

In this buckle tongue, in spite of the occurring deformations in a vehicle accident, a sufficient inhibition of the motility of the strap can be achieved by the buckle tongue, so that the pelvic portion and the upper body portion of the strap are decoupled in the event of an accident.

However, due to the mounting of the clamping element with its convex outer surface on the tongue body, the tongue body has a relatively large and asymmetrical extension transverse to the plug-in direction.

An object of the present invention is therefore to overcome the disadvantages at least partially, described with reference to the prior art, and in particular, to provide a buckle tongue, which is compactly built, and which allows the safe decoupling of the upper body portion from the pelvic portion of the strap in the event of an accident. Additional objects are to reduce rattling noises and to allow the self-locking of the deflection element in the loading position.

SUMMARY AND INTRODUCTORY DESCRIPTION

The above-noted problem is solved by a seat belt buckle tongue having the features described herein taken in connection with the drawings.

In the buckle tongue, in accordance with an embodiment of the present invention, at least in the loading position, the tongue body with a region having a contact surface engages with at least one portion or region of the deflection element.

Due to the punching-through of the tongue body through the deflection element, the induced inhibition- or clamping region built by the constriction portion and the contact surface for the strap portion can be formed directly in or adjacent to the strap slot.

Thus, it is sufficient that in the tongue body, a single strap slot is formed. In addition, the strap slot may be made narrower in its extension transverse to the plug-in direction.

The tongue body is therefore particularly formed in such a way that it protrudes in the direction of the strap slot with a region having a contact surface, for example, in the form of a protruding extension in the direction of the strap slot.

The deflection element is preferably formed in such a way that it is also formed both in front of and behind the region of the tongue body, having the contact surface, at least partially in the strap-course direction. However, the deflection element must not completely surround the region of the tongue body, having a contact surface. It is sufficient if some portions of the deflection element are arranged in front of and some portions of the deflection element behind the region of the tongue body, having a contact surface.

In the passage position, the deflection element may be arranged in such a way that the strap cannot come into contact with the contact surface of the tongue body. In particular, the deflection element may be stretched by means of a spring element in the passage position.

If, for example, in the event of a vehicle accident, a tensile force is introduced into the strap, the deflection element is moved from the passage position into the loading position.

In particular, the deflection element can, for this purpose, be mounted pivotably around a pivot axis on the tongue body. The pivot axis may simultaneously provide a restoring force.

In the loading position, the constriction portion of the deflection element is particularly positioned to the contact surface of the tongue body, so that the strap is guided through a gap between the contact surface and the constriction portion, and in particular, an S-shaped course is formed in a longitudinal portion.

The gap extending in the strap-course direction has, in particular at its narrowest point, the size which is less than the thickness of the strap.

The deflection element is therefore not moved, with its constriction portion, directly to the contact surface, but rather is moved along, in particular, parallel to the contact surface of the tongue body.

The strap is thus not pressed by the deflection element on the contact surface of the tongue body. Rather, a constriction for the strap is formed through the gap between the contact surface and the constriction portion.

The tongue body and the deflection element are thus formed, so that there is always a gap between the constriction portion and the contact surface, forming a constriction for the strap.

An inhibition of the motility of the strap takes place, inter alia, due to the double deflection at the beginning and at the end of the strap portion and due to the narrow gap, forming the constriction.

The contact surface of the tongue body and the constriction portion of the deflection element can, in particular, be formed in such a way that the gap forming between them in the loading position tapers in the strap-course direction.

The gap present in the loading position has, in particular, an extension of at least 5 mm (millimeters) in the strap-course direction, preferably of at least 8 mm, or even of at least 10 mm.

The contact surface and the constriction portion extend to the loading position in this region, particularly parallel to each other.

In one embodiment, the deflection element has a leg, which is deflected by the strap from the passage position to the loading position, that is in direct contact, wherein the deflection element has a bracket, which engages with the strap and forms the constriction portion.

The strap is passed particularly between the bracket and the leg. In particular, the bracket, forming the constriction portion, in the passage portion, is arranged in the strap slot, wherein the region of the tongue body, having a relatively large opening for the strap between the bracket and the contact surface, is formed. In this respect, the strap is easily passed through the gap.

Now, if a tensile force is introduced into the strap, this engages with the legs of the deflection element so that the deflection element is moved particularly around the pivot axis.

During pivoting, the bracket is pivoted with the constriction portion, so that a relatively narrow gap between the constriction portion of the deflection element and the contact surface of the tongue body is formed. The leg is, in particular, pivoted into a recess in the tongue body when it reaches the loading position.

In a preferred embodiment, it can be provided that the strap in the strap portion is deflected in the longitudinal extension direction of the strap through the contact surface and the constriction portion. Thus, the strap has a deflection point in the strap portion, in which the strap is flat against the contact surface and the constriction portion.

Thus, in the loading position directly behind each other, two chicanes for the strap are formed.

Preferably, the deflection element and/or the tongue body is shaped in such a way that in the loading position, at least three deflection points for the strap are formed by the buckle tongue, wherein in the loading position, due to the deflection element moving from the passage position to the loading position, more deflection points are formed as for the loop-shaped deflected strap in the passage position.

In addition to the deflection points in the region of the constriction portion of the deflection element and the contact surface of the tongue body, further deflection points for the strap are formed by the tongue body or the deflection element.

The deflection points are, in particular, formed through the end region of the legs of the deflection element. It is now provided that more deflection points are formed in the loading position than in the passage position, so that the forces inhibiting the movement of the strap are increased.

The bracket thus extends transversely to the strap-course direction from one side of the deflection element to the opposite side, so that the bracket during the pivoting of the deflection element is also pivoted. So, the bracket spans over the strap.

In particular, the bracket is arranged in such a way that the bracket deflects the strap in the loading position within the strap slot and specifies the strap in the strap slot against a curvature direction opposing the rest of the course.

Preferably, the deflection element is pivotally mounted on the tongue body.

In particular, the strap is onto the deflection element in such a way that the strap directly acts upon the deflection element with force during the introduction of the force, so that it is pivoted.

Preferably, the deflection element is approximated in a cross-section of a U-shape, wherein the regions of the deflection element, forming one leg or the legs, is/are arranged in the passage position in the recess, and the other leg, opposite to the pivot axis, is arranged only in the loading position in a further recess in the tongue body.

The pivot axis is particularly formed in a region of the deflection element, connecting the leg.

In one embodiment of the buckle tongue is provided that the deflection element and/or the tongue body is formed and the deflection element in the loading position is deflected in such a way that the strap between two deflection points spaced from the buckle tongue extends, or abuts with less static friction on the buckle tongue, in comparison with the static friction of the deflection point.

The strap is, in particular, in the loading position at four, preferably with deflection points formed of a friction-increasing material, where the strap, in particular, has a smaller curvature radius than in front of, behind and between the deflection points.

In particular, the strap stretches straight between the deflection points straightly.

Thus, the strap contacts, in the strap-course direction, at least at three successively arranged points with an increased static friction on the buckle tongue.

It has been shown that even due to this change between high static friction and low or no static friction at the same time with lower curvature radius of the strap, a safe buckle position is given at the deflection points.

In the passage position, however, at least one of the deflection points with a friction-increasing material is not in contact with the strap.

In particular, the deflection element is stretched in the passage position by means of a spring element. Preferably, a bearing element forming the pivot axis may be formed as a torsion spring, so that no additional component is required for the spring element.

The deflection points can be formed either by the deflection element or by the tongue body itself.

In particular, the tongue body has a buckle tongue plate and an encapsulation at least partially surrounding the buckle tongue plate, made of a plastic. At the encapsulation, the material further increasing the friction of the encapsulation can be formed.

In particular, at least the first deflection point in the strap-course and the final deflection point of the deflection element are formed, wherein further at least two deflection points are formed in the strap-course between the first and the last deflection points. As far as middle deflection points between the first deflection point and the last deflection point can also be formed by the deflection element, it is preferable that the middle deflection point is formed by the region of the tongue body, having a contact surface, and another middle deflection point is formed by the constriction portion of the deflection element opposite to the loading position of the contact surface.

In particular, the buckle tongue in the region of the deflection points, formed by them, is made of a material, which has a relatively high friction coefficient.

In a preferred embodiment, it can be provided that the deflection element forms a second leg with a friction-increasing material at the end region of the second leg, wherein the end region of the second leg in the passage position is arranged in at least one recess of the tongue body, and is moved to the loading position out of the recess of the tongue body, so that the end region of the second leg with the friction-increasing material is in contact with the strap and forms a deflection point for the strap.

In the passage position, the deflection element is thus mounted onto the tongue body in such a way that the region of the deflection element with the friction-increasing material is arranged in the recess and does not come into contact with the strap.

If a tensile force is introduced into the strap, the deflection element, due to the tensile force particularly directly acting on the deflection element, is moved in such a way that the friction-increasing material of the deflection element is moved out of the recess of the tongue body, in particular, is pivoted.

In the deflected position, the friction-increasing material is in contact with the strap, whereby the strap is prevented from moving relative to the friction-increasing material.

In addition, a deflection point for the strap is formed through the end region in the deflection point, on which the strap is deflected.

The strap extends in front of and behind the deflection point in its longitudinal extension in different directions.

In particular, the strap extends in front of and behind the deflection point at least in portions straight. By the contact of the strap at the deflection point, the static friction is further increased.

To prevent rattling noises, an independent invention is provided independently of the solution described above therein, that the deflection element is stretched by use of at least one spring element in the passage position.

By the stretch is prevented that the deflection element performs unintended movements, whereby rattling noises can be reduced or eliminated. The spring element may be formed as a separate component on the buckle tongue, so that this fulfills only the task of stretching.

Alternatively, the spring element can be integrated in another component of the buckle tongue.

For this purpose, the torsion spring forming the pivot axis has already been indicated.

However, it is preferred that the spring element is formed independently of the torsion spring, which forms the pivot axis.

In this context, it is particularly preferred that at least one spring element is formed through at least one arm formed integrated with the tongue body. At least one arm is preferably a component of the plastic encapsulation of a metallic plate, which together form the tongue body.

At least, one arm extends, in particular, from one side of the tongue body to an opposite side, in particular, adjacent to or inside the strap slot, through the tongue body.

In addition, at least one arm is preferably in contact with the first leg of the deflection element.

In addition to providing the stretching acting in the direction of the passage position, at least one spring element also causes an increase in the activation force of the deflection element.

To enable a self-locking of the deflection element in the loading position, a further feature is provided independently of the solutions described above, in particular therein, that outwardly projecting stop elements are formed on the deflection element, which, in the loading position, is in contact with the counter stop surfaces on the tongue body, wherein the counter stop surfaces are arranged laterally relative to the strap slot.

The counter stop surfaces are formed, in particular, in the encapsulation of the tongue body, wherein the recess thus formed is preferably shaped in such a way that after the introduction of force into the deflection element, the stop element is jammed in the recess.

It is preferred that the deflection element has a first leg, which is deflected directly by the strap out of the passage position into the loading position, wherein the stop elements are arranged at least in the passage position on a side facing away from the first leg of the tongue body.

In the loading position, the force is introduced via the strap mainly in the first leg, wherein the transmission of the force from the stop element to the counter stop surface in the tongue body takes place on a side opposite to this introduction point.

In particular, the plate of the tongue body is thus arranged between the contact point of the strap and the first leg and the contact surface of the stop element and the stop surface, so that a favorable force is applied.

BRIEF DESCRIPTION OF THE DRAWINGS

The invention as well as the technical background are exemplified below using the figures. It shows schematically.

DETAILED DESCRIPTION

The buckle tongue 1 shown in the figures each comprise a tongue body 3, which extends in a plug-in direction 2 (the direction of insertion of the buckle tongue into an associated seat belt buckle, not shown). In the tongue body 3, a strap slot 4 is formed, through which a strap 5 (shown in later figures) is guided.

Towards the strap slot 4, a region of the tongue body 3 protrudes forth, on which a contact surface 19 is formed.

On the tongue body 3, a deflection element 6 is pivotably mounted. The deflection element 6 has a first leg 7 and a bracket 14, on which a constriction portion 18 is formed.

Figure 3:
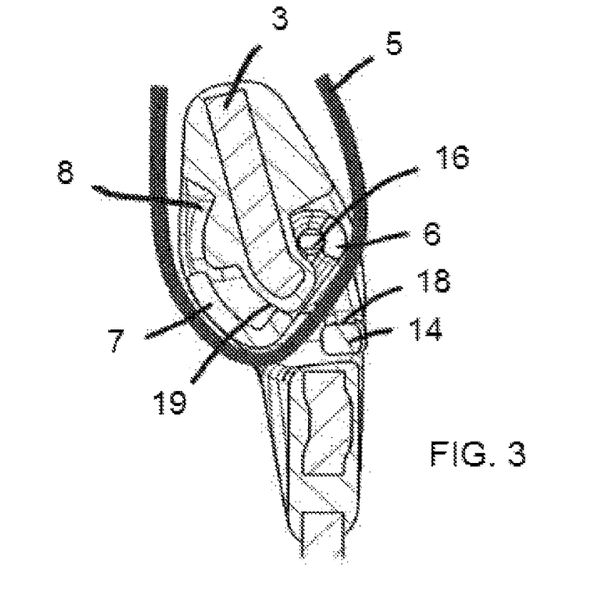
FIG. 3 is a longitudinal section through the first embodiment of the buckle tongue in the passage position.
Figure 5:
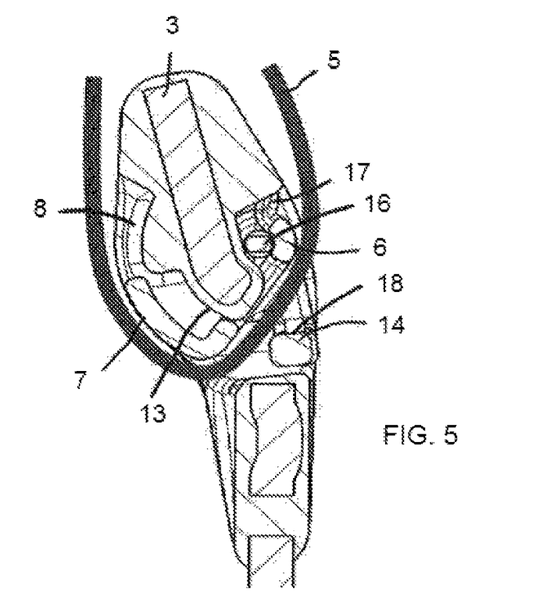
FIG. 5 is a longitudinal section through the second embodiment of the buckle tongue in the passage position.
Figure 7:
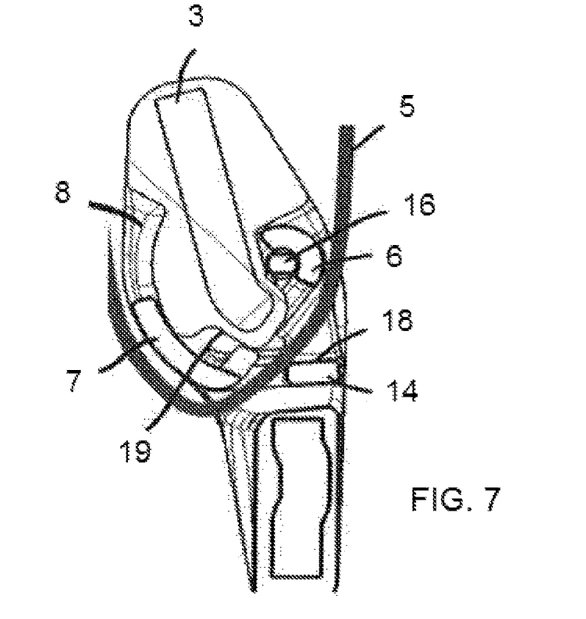
FIG. 7 is a longitudinal section through a third embodiment of the buckle tongue in the passage position.

In the passage position shown in FIGS. 3. 5 and 7, the strap 5 is movable through the strap slot 4, since the distance between the bracket 14 and tongue body 3 is sufficiently large, that is greater than the thickness of the strap 5.

Now, if a tensile force is introduced into the strap 5, this tensile force is transmitted directly to the first leg 7 and the deflection element 6 is pivoted around an axis 16.

In this case, the bracket 14 moves along the contact surface 19 of the tongue body 3, so that a narrow gap extending in the strap-course direction, between the constriction portion 18 of the bracket 14 and the contact surface 19 is formed. The height of the gap is less than the thickness of the strap 5, so that the movement of the strap 5 is inhibited.

Moreover, through the contact surface 19 and the bracket 14, deflection points 10 are formed for the strap 5, so that the strap 5 is deflected in different directions in front of and behind the gap.

The embodiments of the buckle tongue 1 differ in the physical configuration of the deflector element 6, the tongue body 3, and the resulting different configuration of the further deflection points 10.

Figure 1:
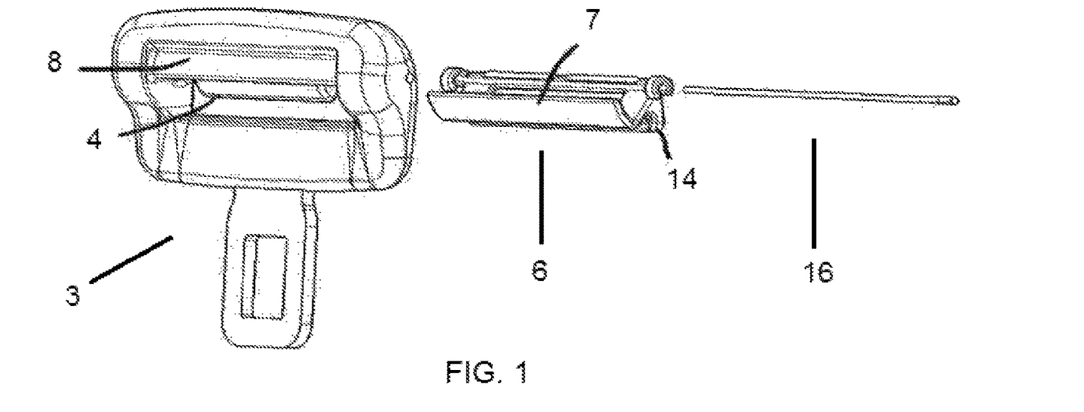
FIG. 1 is a partially exploded view of a first embodiment of a buckle tongue.

Thus, according to the embodiments of FIGS. 1. 3 and 4, the deflection points 10 in the loading position (see FIG. 4) are formed by the deflection element 6 and the tongue body 3. Both the first deflection point 12 and the last deflection point 15 in the strap-course are each formed by the deflection element 6. The middle deflection point 13, however, is formed by the interaction of the tongue body 3 with the bracket 14.

Figure 4:
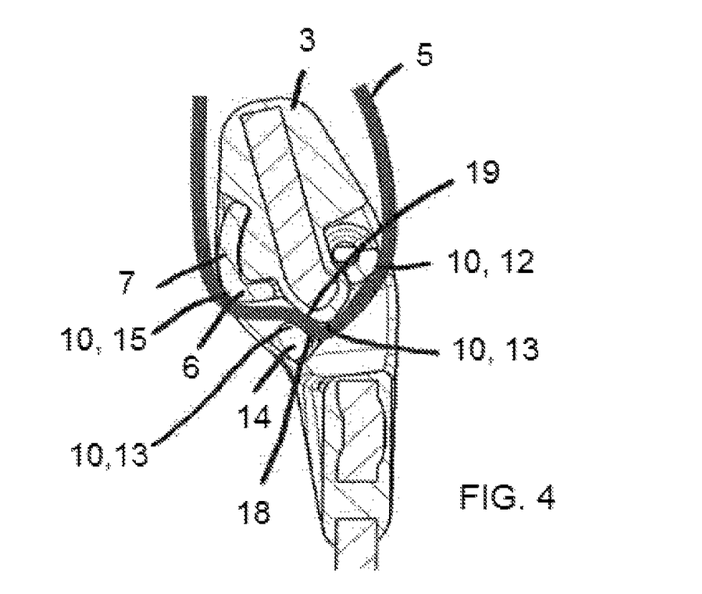
FIG. 4 is a longitudinal section through the first embodiment of the buckle tongue in the loading position.

The strap 5 is thus guided by a chicane course formed by the contact surface 19 of the tongue body 3 and the constriction portion 18 of the bracket 14, and it is curved in different directions in front of and behind the chicane course.

Figure 2:
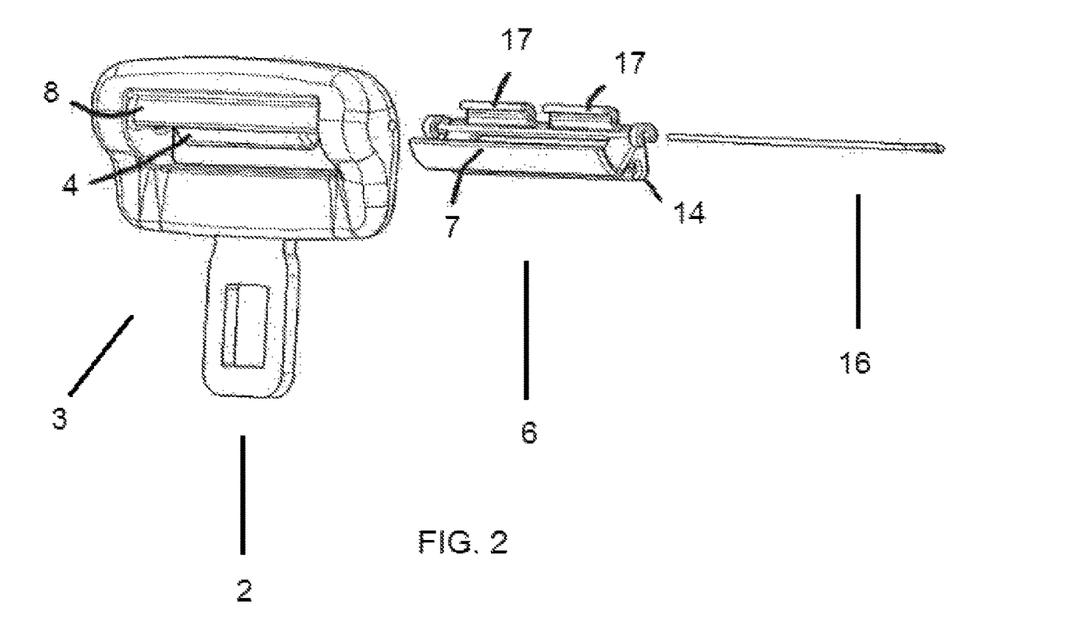
FIG. 2 is a partially exploded view of a second embodiment of a buckle tongue.
Figure 6:
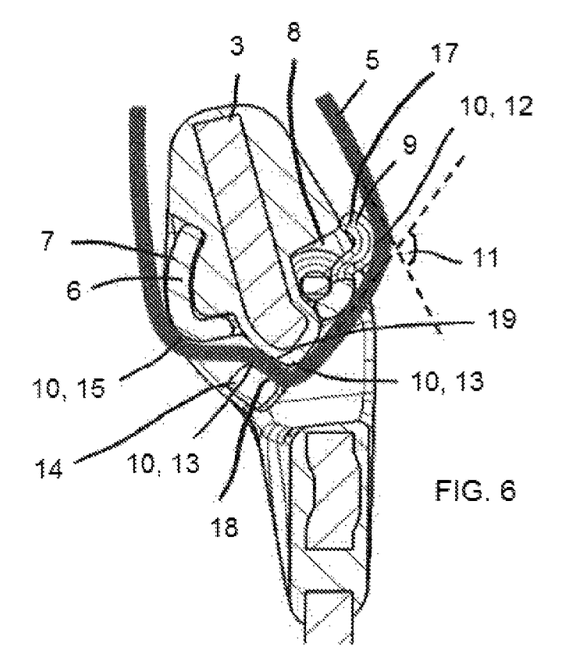
FIG. 6 is a longitudinal section through the second embodiment of the buckle tongue in the loading position.

The second embodiment of FIGS. 2, 5 and 6 has a second leg 17, consisting of multiple portions, with an end region 9. In the passage position, the end region 9 of the deflection element 6 is arranged in a corresponding recess 8 in the tongue body 3 (see FIG. 5), so that the strap 5 in the passage position does not come into contact with the end region.

Now, if a tensile force is introduced into the strap 5, the deflection element 6 pivots out of the recess 8 with the second leg 17, wherein the pivoted end region 9 of the deflection element 6 forms a deflection point 10 for the strap 5 (see FIG. 6).

Figure 8:
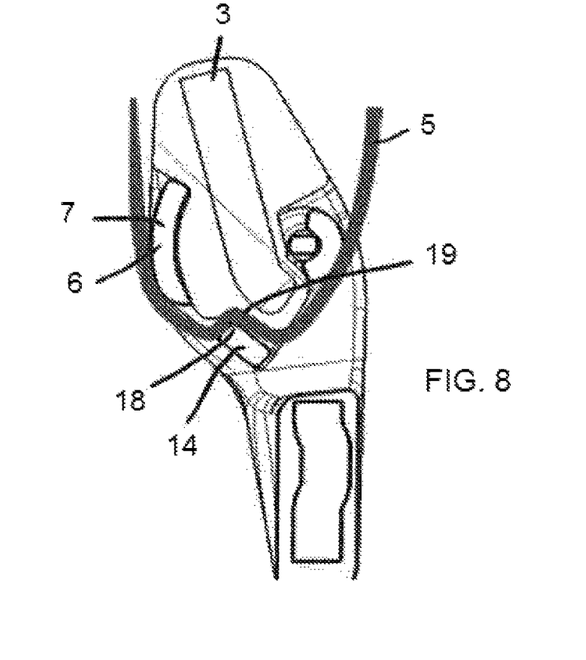
FIG. 8 is a longitudinal section through the third embodiment of the buckle tongue in the loading position.

The embodiment shown in FIGS. 7 and 8 differs from the previous embodiments in that the deflection element 6 and the tongue body 3 are shaped in such a way that in the loading position, the strap 5 in the strap portion, which is in contact with both the constriction portion 18 of the bracket 14 and the contact surface 19 of the tongue body 3, is deflected by the tongue body 3 and the bracket 14. In this respect, a further chicane is formed, which prevents the strap 5 from moving through the gap between the bracket 14 and tongue body 3.

All embodiments have in common that the strap 5 at the deflection points 10 is, each under a relatively large static friction, in contact with the deflection element 6 or the tongue body 3, wherein the strap 5 between at least two deflection points 10 is not in contact with or only with less static friction on buckle tongue 1.

Due to the relatively small curvature radius at the deflection points 10 and the optionally increased static friction, depending on a suitable material selection, at the deflection points 10, it is ensured in combination with the chicane formed by the strap 14 and the tongue 3 that the strap 5 in the loading position is restricted from its moving even at high forces, so that the chest portion of the strap 5 is decoupled from the pelvic portion of the strap 5.

Figure 9:
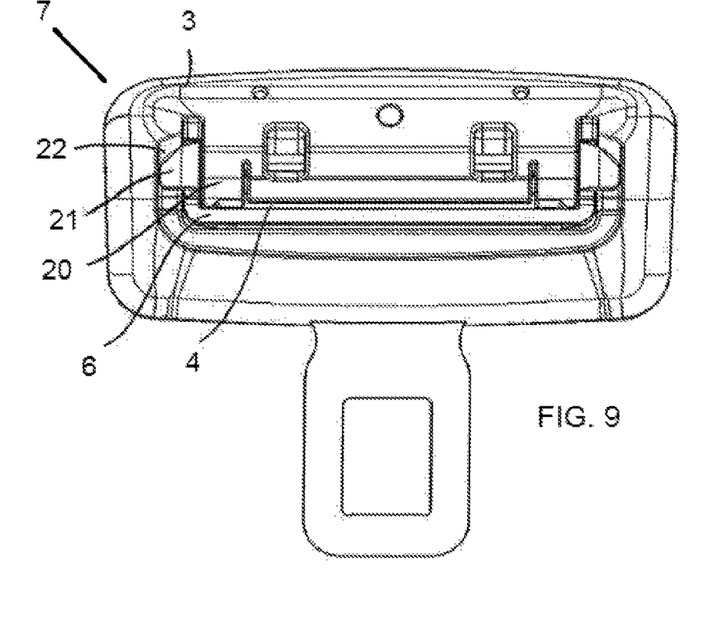
FIG. 9 is a front view of a fourth embodiment of the buckle tongue.
Figure 12:
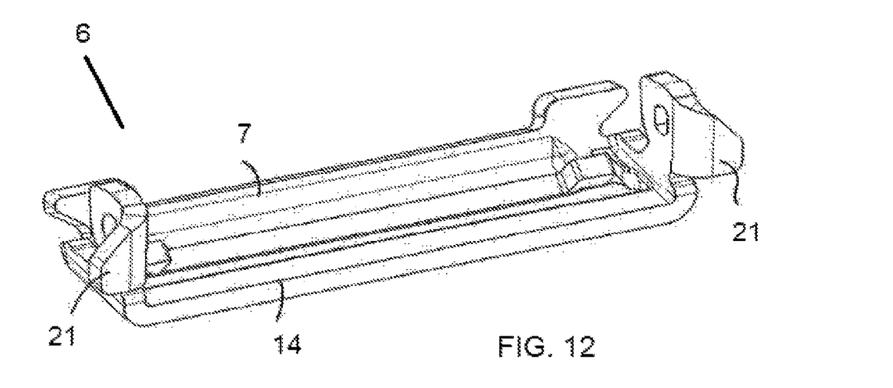
FIG. 12 is a perspective view of the deflection element of the fourth embodiment.

The fourth embodiment of the buckle tongue shown in FIG. 9 has the deflection element 6 shown in FIG. 12, which has the first leg 7 and the bracket 14 according to the embodiments described above. The following therefore mainly addresses the differences from the previously described embodiments.

Thus, on an encapsulation 24, at least partially surrounding a plate 23, spring elements are formed in the form of arms 20. The arms 20 are integrally formed with the encapsulation 24 and in contact with the deflection element 6 (see FIGS. 10 and 11).

Figure 10:
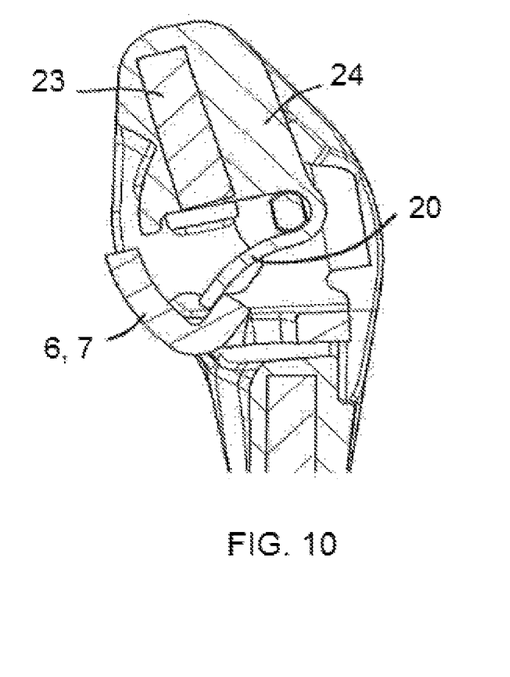
FIG. 10 is a longitudinal section through the fourth embodiment of the buckle tongue in the region of a spring element in the passage position.
Figure 11:
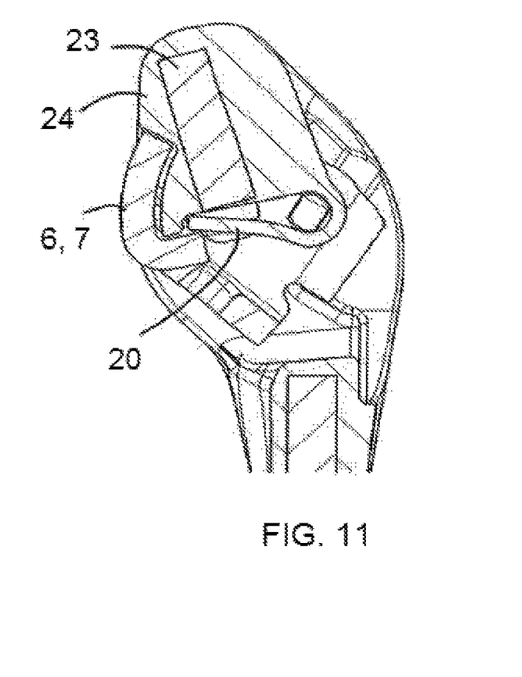
FIG. 11 is the longitudinal section according to FIG. 10 in the loading position.

The arms 20 are designed in such a way that they stretch the deflection element 6 to the passage position shown in FIG. 10. If a force is introduced into the buckle tongue 1 via the strap, the arms 20 are deflected by the deflection element 6 against its spring force (see FIG. 11).

Figure 13:
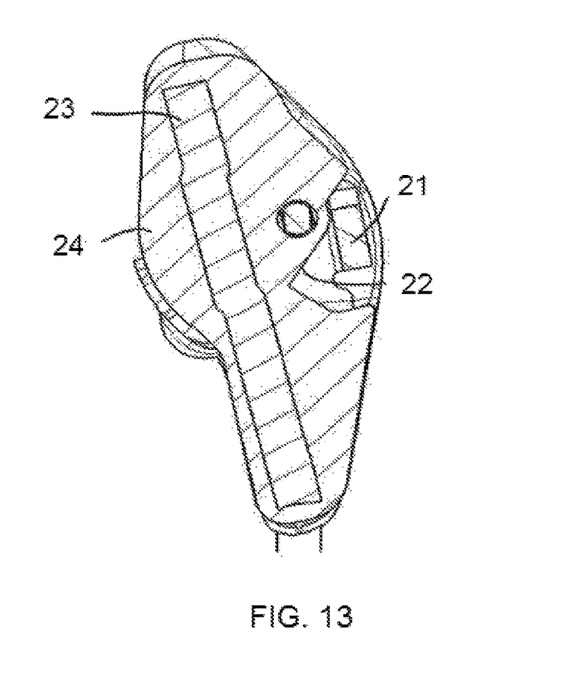
FIG. 13 is a longitudinal section through the fourth embodiment of the buckle tongue in the region of a stop element in the passage position.
Figure 14:
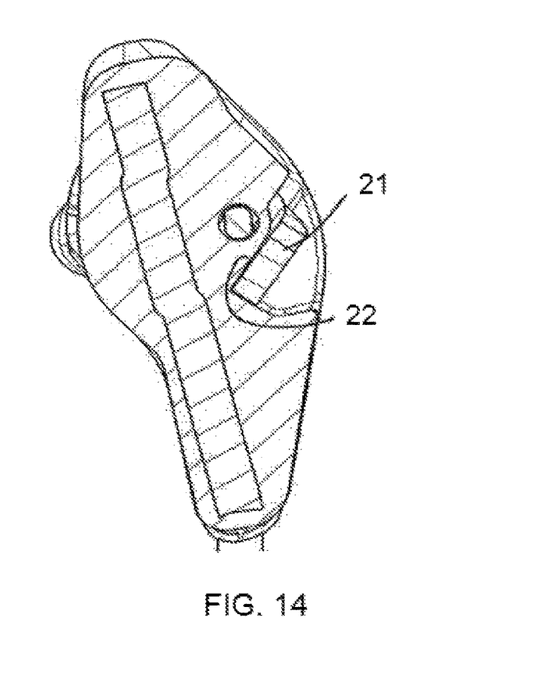
FIG. 14 is the longitudinal section through the fourth embodiment according to FIG. 13 in the loading position.

The deflection element 6 also forms laterally projecting stop elements 21, which are arranged in a recess in the encapsulation 24, wherein counter-stop surfaces 22 are formed by the encapsulation 24 (see FIG. 9 in combination with FIGS. 13 and 14).

In the loading position shown in FIG. 14, the stop element 21 comes into contact with the counter stop surface 22, where optionally, a self-locking of the deflection element 6 can occur due to the shape of the recess in the encapsulation 24. The counter stop surface 22 is arranged at least in such a way that the introduction of force takes place in the vicinity of the plate 23.

While the above description constitutes the preferred embodiment of the present invention, it will be appreciated that the invention is susceptible to modification, variation and change without departing from the proper scope and fair meaning of the accompanying claims.

The invention claimed is:

1. A buckle tongue with a tongue body extending in a plug-in direction, in which a strap slot is formed for the passage of a seat belt strap comprising,
 a deflection element movably arranged in the tongue body, the deflection element forming a first leg and a constriction portion separated to define a slit for passage of the strap,
 wherein the strap, in an unloaded passage position of the deflection element, is movable through the strap slot and through the slit, and the strap is restricted from moving by the deflection element in a loading position of the deflection element induced by an introduced tensile force in the strap which presses against the first leg, wherein the deflection element is movable from the passage position into the loading position with the constriction portion along a contact surface of the tongue body, so that in the loading position, movement of the first leg causes the constriction portion to clamp a portion of the strap between the contact surface of the tongue body and the constriction portion of the deflection element, in the loading position at least a portion of the deflection element engages with the contact surface of the tongue body.

2. The buckle tongue according to claim 1 further comprising, the deflection element is mounted pivotably around a pivot axis on the tongue body.

3. The buckle tongue according to claim 1 further comprising, the constriction portion and the contact surface are shaped in such way that the strap in the strap portion in the longitudinal direction of the strap is deflected by the contact surface and the constriction portion.

4. The buckle tongue according to claim 1 further comprising, in that the deflection element is stretched into the passage position by at least one spring element.

5. The buckle tongue according to claim 4 further comprising, the at least one spring element is formed by at least one arm formed integrally with the tongue body.

6. A buckle tongue with a tongue body extending in a plug-in direction, in which a strap slot is formed for the passage of a seat belt strap comprising,
a deflection element movably arranged in the tongue body,
wherein the strap, in an unloaded passage position of the deflection element, is movable through the strap slot, and the strap is restricted from moving by the deflection element in a loading position of the deflection element induced by an introduced tensile force in the strap,
wherein the deflection element is movable from the passage position into the loading position with the constriction portion along a contact surface of the tongue body, so that in the loading position, movement of the deflection element causes the constriction portion to clamp a portion of the strap between the contact surface of the tongue body and the constriction portion of the deflection element, in the loading position at least a portion of the deflection element engages with the contact surface of the tongue body, wherein the deflection element has a first leg, which is deflected directly by the strap from the passage position into the loading position, wherein the deflection element has a bracket which engages with the strap and forms the constriction portion.

7. A buckle tongue with a tongue body extending in a plug-in direction, in which a strap slot is formed for the passage of a seat belt strap comprising,
a deflection element movably arranged in the tongue body,
wherein the strap, in an unloaded passage position of the deflection element, is movable through the strap slot, and the strap is restricted from moving by the deflection element in a loading position of the deflection element induced by an introduced tensile force in the strap,
wherein the deflection element is movable from the passage position into the loading position with the constriction portion along a contact surface of the tongue body, so that in the loading position, movement of the deflection element causes the constriction portion to clamp a portion of the strap between the contact surface of the tongue body and the constriction portion of the deflection element, in the loading position at least a portion of the deflection element engages with the contact surface of the tongue body, the deflection element or the tongue body is shaped in such a way that in the loading position, at least three deflection points for the strap of the buckle tongue are formed, wherein in the loading position, due to the deflection element moving from the passage position to the loading position, more deflection points are formed than for the deflected strap in the passage position.

8. The buckle tongue according to claim 7 further comprising, at least a first deflection point in a strap-course and a last deflection point of the deflection element are formed, and more of the deflection points are formed in the strap-course direction between the first deflection point and the last deflection point.

9. The buckle tongue according to claim 8 further comprising, a middle deflection point is formed in the region of the contact surface of the tongue body and on the opposite constriction portion of the deflection element in the loading position of the contact surface.

10. The buckle tongue according to claim 8 further comprising, in the loading position a chicane course for the strap is formed by the deflection points from the constriction portion in the strap-course direction.

11. The buckle tongue according to claim 8 further comprising, in the loading position a chicane course for the strap is formed by the deflection points from the constriction portion in the strap-course direction opposite the strap-course direction.

12. The buckle tongue according to claim 7 further comprising, the buckle tongue in the region of the deflection points is formed of a material which has a relatively high friction coefficient.

13. A buckle tongue with a tongue body extending in a plug-in direction, in which a strap slot is formed for the passage of a seat belt strap comprising,
a deflection element movably arranged in the tongue body,
wherein the strap, in an unloaded passage position of the deflection element, is movable through the strap slot, and the strap is restricted from moving by the deflection element in a loading position of the deflection element induced by an introduced tensile force in the strap,
wherein the deflection element is movable from the passage position into the loading position with the constriction portion along a contact surface of the tongue body, so that in the loading position, movement of the deflection element causes the constriction portion to clamp a portion of the strap between the contact surface of the tongue body and the constriction portion of the deflection element, in the loading position at least a portion of the deflection element engages with the contact surface of the tongue body, the deflection element or the tongue body is shaped and the deflection element in the loading position is deflected in such a way that, in the loading position, the strap between two deflection points spaced from the buckle tongue stretches or is in contact with a lower static friction surface at the buckle tongue in comparison with the static friction surface of the deflection points.

14. A buckle tongue with a tongue body extending in a plug-in direction, in which a strap slot is formed for the passage of a seat belt strap comprising,
a deflection element movably arranged in the tongue body,
wherein the strap, in an unloaded passage position of the deflection element, is movable through the strap slot, and the strap is restricted from moving by the deflection element in a loading position of the deflection element induced by an introduced tensile force in the strap, wherein the deflection element is movable from the passage position into the loading position with the constriction portion along a contact surface of the tongue body, so that in the loading position, movement of the deflection element causes the constriction portion to clamp a portion of the strap between the contact surface of the tongue body and the constriction portion of the deflection element, in the loading position at least a portion of the deflection element engages with the contact surface of the tongue body, the deflection element has a leg with a friction-increasing material at an end region of the leg, wherein the end region of the leg in the passage position is arranged in at least one recess of the tongue body, and is moved out of the recess of the tongue body to the loading position, so that the end region with the friction-increasing material is in contact with the strap and forms a deflection point for the strap.

15. A buckle tongue with a tongue body extending in a plug-in direction, in which a strap slot is formed for the passage of a seat belt strap comprising,
a deflection element movably arranged in the tongue body,
wherein the strap, in an unloaded passage position of the deflection element, is movable through the strap slot, and the strap is restricted from moving by the deflection element in a loading position of the deflection element induced by an introduced tensile force in the strap, wherein the deflection element is movable from the passage position into the loading position with the constriction portion along a contact surface of the tongue body, so that in the loading position, movement of the deflection element causes the constriction portion to clamp a portion of the strap between the contact surface of the tongue body and the constriction portion of the deflection element, in the loading position at least a portion of the deflection element engages with the contact surface of the tongue body, on the deflection element, outwardly projecting stop elements are formed, which are in the loading position in contact with counter stop surfaces on the tongue body, wherein the counter stop surfaces are arranged laterally to the strap slot.

16. The buckle tongue according to claim 15 further comprising, the deflection element has a first leg which is deflected directly by the strap from the passage position into the loading position, and wherein the stop elements are arranged at least in the passage position on a side facing away from the first leg of the tongue body.

* * * * *